(12) United States Patent
Gally et al.

(10) Patent No.: US 7,944,601 B2
(45) Date of Patent: May 17, 2011

(54) DISPLAY DEVICE

(75) Inventors: Brian J Gally, Los Gatos, CA (US); William J Cummings, Millbrae, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 17 days.

(21) Appl. No.: 12/498,281

(22) Filed: Jul. 6, 2009

(65) Prior Publication Data

US 2009/0267869 A1    Oct. 29, 2009

Related U.S. Application Data

(60) Division of application No. 12/115,472, filed on May 5, 2008, now Pat. No. 7,583,429, which is a continuation of application No. 11/208,108, filed on Aug. 20, 2005, now Pat. No. 7,369,294.

(60) Provisional application No. 60/613,298, filed on Sep. 27, 2004.

(51) Int. Cl.
*G02B 26/00* (2006.01)

(52) U.S. Cl. .................. 359/290; 359/260; 359/298

(58) Field of Classification Search .......... 359/22, 359/32, 260, 290–295, 298; 345/2.3, 32, 345/85, 87, 158, 173; 348/552, 553; 725/81
See application file for complete search history.

(56) References Cited

U.S. PATENT DOCUMENTS

| | | |
|---|---|---|
| 2,700,919 A | 2/1955 | Boone |
| 2,882,631 A | 4/1959 | Boone |
| 3,460,303 A | 8/1969 | Algrain et al. |
| 3,725,112 A | 4/1973 | Hansen |
| 4,405,676 A | 9/1983 | Pohl |
| 4,441,791 A | 4/1984 | Hornbeck |
| 4,571,603 A | 2/1986 | Hornbeck et al. |
| 4,716,672 A | 1/1988 | Arakawa |
| 4,748,366 A | 5/1988 | Taylor |
| 4,807,976 A | 2/1989 | Little et al. |
| 4,859,060 A | 8/1989 | Katagiri et al. |
| 4,866,660 A | 9/1989 | Merkelo et al. |

(Continued)

FOREIGN PATENT DOCUMENTS

EP    0 649 010    4/1995

(Continued)

OTHER PUBLICATIONS

Brank et al., Sep. 2001, RF MEMS-based tunable filters, International Journal of RF and Microwave Computer-Aided Engineering, 11(5):276-284.

(Continued)

*Primary Examiner* — Loha Ben
(74) *Attorney, Agent, or Firm* — Knobbe Martens Olson & Bear, LLP

(57) ABSTRACT

An ornamental display device having an interferometric modulator for displaying an ornamental image. The ornamental device may also have a signal receiver configured to receive an external signal. The ornamental device may further have a processor configured to control an image on the display based on the external signal. The external signal is emitted from a controller configured to control a plurality of ornamental devices to display coordinated images. The ornamental device may have a patterned diffuser formed on a transparent substrate to provide an ornamental image or information. The ornamental device may be a piece of jewelry or an article that may be worn. The image displayed may have an iridescent appearance. A controller may also be used to control images displayed on multiple ornamental device to provide coordinated images based on externals received or preprogrammed images.

50 Claims, 11 Drawing Sheets

U.S. PATENT DOCUMENTS

| | | | |
|---|---|---|---|
| 4,954,789 | A | 9/1990 | Sampsell |
| 5,013,138 | A | 5/1991 | Roosen et al. |
| 5,083,857 | A | 1/1992 | Hornbeck |
| 5,216,537 | A | 6/1993 | Hornbeck |
| 5,226,099 | A | 7/1993 | Mignardi et al. |
| 5,489,952 | A | 2/1996 | Gove et al. |
| 5,526,172 | A | 6/1996 | Kanack |
| 5,530,240 | A | 6/1996 | Larson et al. |
| 5,550,373 | A | 8/1996 | Cole et al. |
| 5,551,293 | A | 9/1996 | Boysel et al. |
| 5,629,521 | A | 5/1997 | Lee et al. |
| 5,708,527 | A | 1/1998 | Adamson et al. |
| 5,815,141 | A | 9/1998 | Phares |
| 5,894,686 | A | 4/1999 | Parker et al. |
| 5,977,945 | A | 11/1999 | Ohshima |
| 6,014,121 | A | 1/2000 | Aratani et al. |
| 6,024,455 | A | 2/2000 | O'Neill et al. |
| 6,040,937 | A | 3/2000 | Miles |
| 6,295,048 | B1 | 9/2001 | Ward et al. |
| 6,304,297 | B1 | 10/2001 | Swan |
| 6,307,194 | B1 | 10/2001 | Fitzgibbons et al. |
| 6,307,676 | B1 | 10/2001 | Merrill et al. |
| 6,666,561 | B1 | 12/2003 | Blakley |
| 6,674,562 | B1 | 1/2004 | Miles et al. |
| 6,737,979 | B1 | 5/2004 | Smith et al. |
| 6,797,366 | B2 | 9/2004 | Hanson et al. |
| 6,819,469 | B1 | 11/2004 | Koba |
| 6,829,132 | B2 | 12/2004 | Martin et al. |
| 7,123,216 | B1 | 10/2006 | Miles |
| 7,138,984 | B1 | 11/2006 | Miles |
| 7,280,265 | B2 | 10/2007 | Miles |
| 7,369,294 | B2 | 5/2008 | Gally et al. |
| 7,583,429 | B2 | 9/2009 | Gally et al. |
| 2002/0075555 | A1 | 6/2002 | Miles |
| 2002/0126364 | A1 | 9/2002 | Miles |
| 2003/0112507 | A1 | 6/2003 | Divelbiss et al. |
| 2003/0117382 | A1 | 6/2003 | Pawlowski et al. |
| 2003/0128197 | A1 | 7/2003 | Turner et al. |
| 2004/0024580 | A1 | 2/2004 | Salmonsen et al. |
| 2004/0027701 | A1 | 2/2004 | Ishikawa |
| 2004/0125281 | A1 | 7/2004 | Lin et al. |
| 2005/0001797 | A1 | 1/2005 | Miller et al. |
| 2005/0068254 | A1 | 3/2005 | Booth |
| 2005/0195468 | A1 | 9/2005 | Sampsell |
| 2007/0023851 | A1 | 2/2007 | Hartzell et al. |
| 2007/0247406 | A1 | 10/2007 | Zhou et al. |
| 2010/0220248 | A1 | 9/2010 | Miles |

FOREIGN PATENT DOCUMENTS

| | | |
|---|---|---|
| EP | 0 725 380 | 8/1996 |
| WO | WO 2004/066256 | 8/2004 |
| WO | WO 2005/066596 | 7/2005 |

OTHER PUBLICATIONS

Miles, "A New Reflective FPD Technology Using Interferometric Modulation," Journal of the SID 5/4, 1997, pp. 379-382.

Mark W. Miles, "MEMS-based interferometric modulator for display applications," Proceedings of SPIE, vol. 3876, Aug. 1999, pp. 20-28.

Miles et al., 10.1: Digital Paper™ for reflective displays, SID 02 Digest, pp. 115-117, 2002.

Winton, John M., "A novel way to capture solar energy," Chemical Week, pp. 17-18 (May 15, 1985).

Wu, "Design of a Reflective Color LCD Using Optical Interference Reflectors," ASIA Display '95, pp. 929-931 (Oct. 16, 1995).

Office Action dated Nov. 8, 2007 in U.S. Appl. No. 11/208,108.

Office Action dated Dec. 19, 2008 in U.S. Appl. No. 12/115,472.

Official Communication dated Sep. 10, 2010 in European App. No. 05797866.0.

|  | +V$_{bias}$ | -V$_{bias}$ |
|---|---|---|
| 0 | Stable | Stable |
| +ΔV | Relax | Actuate |
| −ΔV | Actuate | Relax |

Column Output Signals / Row Output Signals

DISPLAY DEVICE

RELATED APPLICATIONS

This application is a divisional application of U.S. patent application Ser. No. 12/115,472, filed May 5, 2008, now U.S. Pat. No. 7,583,429, titled "ORNAMENTAL DISPLAY DEVICE," which is a continuation of U.S. patent application Ser. No. 11/208,108, filed Aug. 20, 2005, now U.S. Pat. No. 7,369,294, titled "ORNAMENTAL DISPLAY DEVICE." U.S. patent application Ser. No. 11/208,108 claims the benefit of U.S. Provisional Application No. 60/613,298, filed Sep. 27, 2004, titled "SYSTEM AND METHOD FOR IMPLEMENTATION OF INTERFEROMETRIC MODULATOR DISPLAYS." Each of U.S. patent application Ser. No. 12/115,472, U.S. patent application Ser. No. 11/208,108, and U.S. Provisional Application No. 60/613,298 is hereby incorporated by reference in its entirety.

BACKGROUND

1. Field

The field of the invention relates to microelectromechanical systems (MEMS). More specifically, the field of the invention relates to ornamental devices including interferometric modulators and methods of fabricating such ornamental devices.

2. Description of the Related Technology

Microelectromechanical systems (MEMS) include micromechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENT

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices. The embodiments described herein provide a package structure and a method of manufacturing a package structure in ambient conditions.

One embodiment provides a method of making an ornamental device. A display having an interferometric modulator and a signal receiver are provided. The signal receiver is configured to receive an external signal. A processor is coupled with the display and the signal receiver. The processor is configured to control an image on the display based on an external signal, wherein the external signal is emitted from a controller configured to control a plurality of ornamental devices to display coordinated images.

Another embodiment provides an ornamental device, comprising a display having at least one interferometric modulator, a signal receiver, and a processor. The signal receiver is configured to receive an external signal. The processor is configured to control an image on the display based on the external signal, wherein the external signal is emitted from a controller configured to control a plurality of ornamental devices to display coordinated images.

According to another embodiment, an ornamental device is provided. The ornamental devices includes means for interferometrically modulating light, a receiving means, and a processing means. The receiving means is for receiving an external signal. The processing means is for controlling an image on the modulating means based on the external signal. The external signal is emitted from a controller configured to control a plurality of ornamental devices to display coordinated images.

According to another embodiment, an ornamental article is provided. The ornamental article comprises an array of interferometric modulators configured to form a programmable display. The article also includes a processor configured to maintain a video sequence based on either a pre-programmed image or an external signal.

In another embodiment, an ornamental article is provided. The article comprises a modulating means for interferometrically modulating light for forming a display means for displaying programs and a processing means for maintaining a video sequence on the display means. The video sequence is based on either a pre-programmed image or an external signal.

According to another embodiment, a method is provided for making an ornamental article. A plurality of interferometric modulators is provided. The interferometric modulators are configured into an array to form a programmable display. A processor is electrically connected to the display for maintaining a video sequence on the display based on either a pre-programmed image or an external signal.

According to yet another embodiment, an interferometric modulator is provided. The interferometric modulator is configured to display an iridescent image and comprises a first surface for reflecting light; and a second surface for reflecting light. The second surface is separated from the first surface by a cavity. The first and second surfaces interferometrically modulate light such that more than one distinct color is reflected by the interferometric modulator.

In accordance with another embodiment, an interferometric modulator is provided to display an iridescent image. The interferometric modulator comprises a first means for reflecting light and a second means for reflecting light. The first and second reflecting means interferometrically modulate light such that more than one distinct color is reflected by the interferometric modulator.

According to another embodiment, a method is provided for forming an interferometric modulator. A first reflective layer is provided and a second reflective layer is separated from the first reflective layer by a cavity. The first and second reflective layers interferometrically modulate light such that more than one distinct color is reflected by the interferometric modulator.

According to another embodiment, a method is provided for forming a display device. An interferometric modulator is provided. The interferometric modulator comprises a transparent substrate, a partially reflective layer and a substantially reflective layer spaced apart and separated by a cavity from the partially reflective layer. A diffuser film is formed on transparent substrate of the interferometric modulator and the diffuser film is patterned to have an ornamental effect.

In accordance with yet another embodiment, a display device is provided, comprising a transparent substrate having a first side and a second side, a first surface for reflecting light formed over the first side of the transparent substrate, a second surface for reflecting light, and a patterned diffuser film formed over the second side of the transparent substrate. The second surface is substantially parallel to the first surface, and the second surface is separated from the first surface by a cavity. The patterned diffuser film has an ornamental design.

Still another embodiment is a display device, comprising: means for transmitting light, the transmitting means having a first side and a second side. A first means for reflecting light formed over the first side of the transmitting means and a second means for reflecting light is substantially parallel to the first reflecting means, wherein the second reflecting means is separated from the first reflecting means by a cavity. The embodiment also includes a diffusing means for diffusing light, wherein the diffusing means is patterned and formed over the second side of the transmitting means, wherein the diffusing means has an ornamental design.

BRIEF DESCRIPTION OF THE DRAWINGS

These and other aspects of the invention will be readily apparent from the following description and from the appended drawings (not to scale), which are meant to illustrate and not to limit the invention, and wherein.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

According to embodiments described herein, an interferometric modulator display is provided in an ornamental device. The ornamental device may have a patterned diffuser formed on a transparent substrate to provide an ornamental image. The ornamental device may also be a piece of jewelry or an article that may be worn. The skilled artisan will understand that the ornamental device may have an attachment means, such as, for example, a chain or a strap. The image displayed may have an iridescent appearance. A controller may also be used to control images displayed on multiple ornamental device to provide coordinated images based on external signals received or pre-programmed images.

Figure 1:
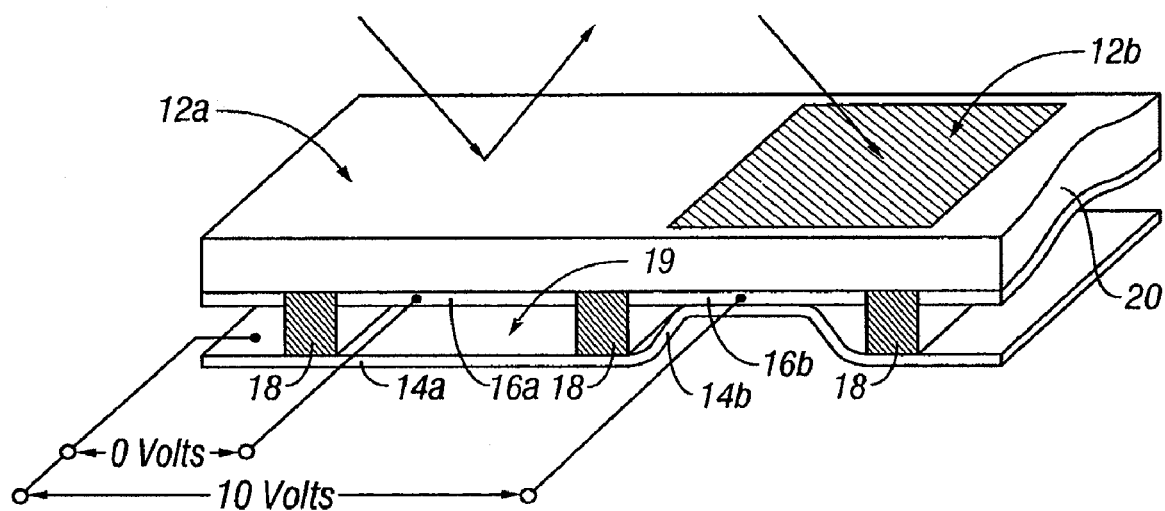
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
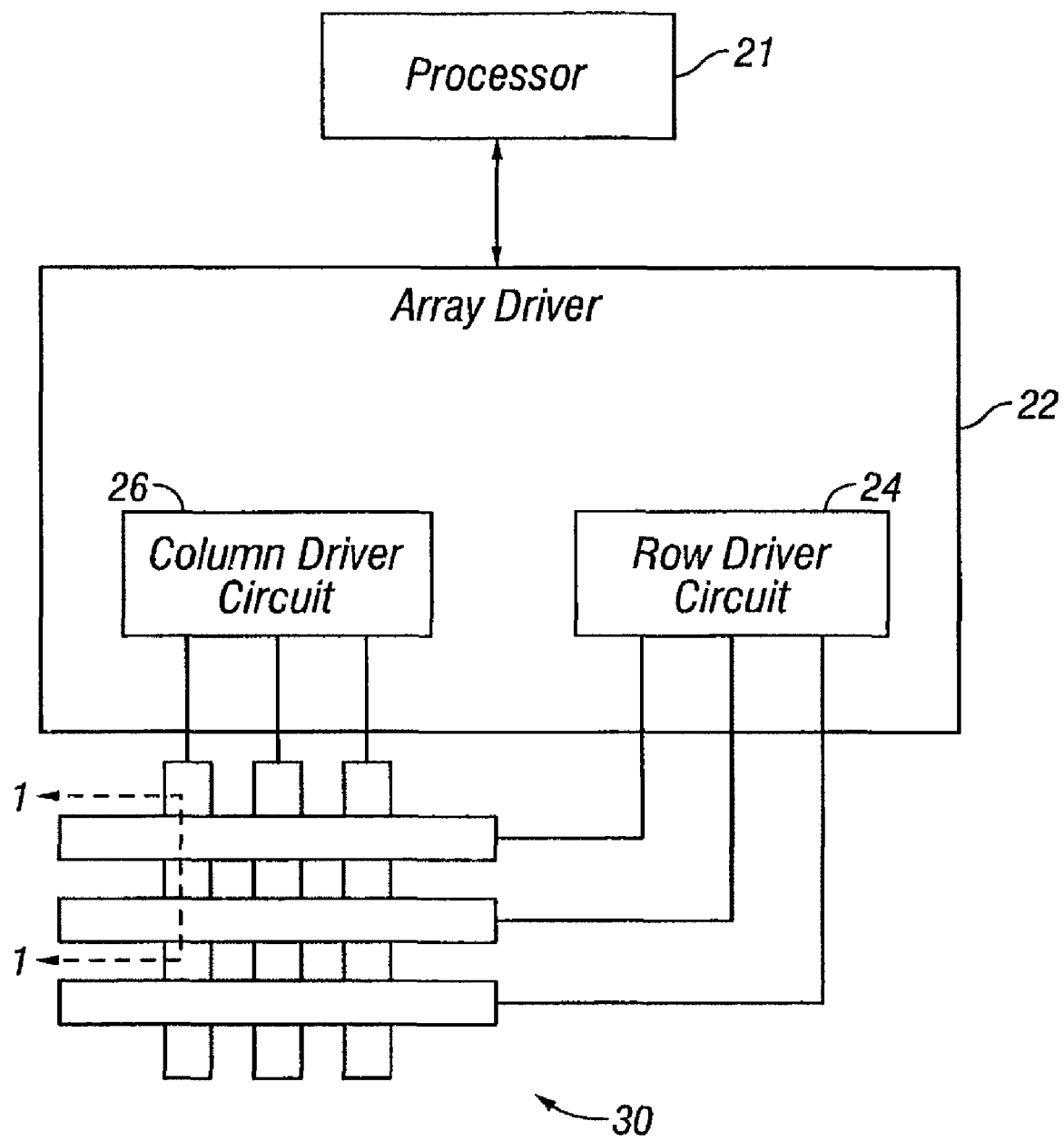
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volt. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state.Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
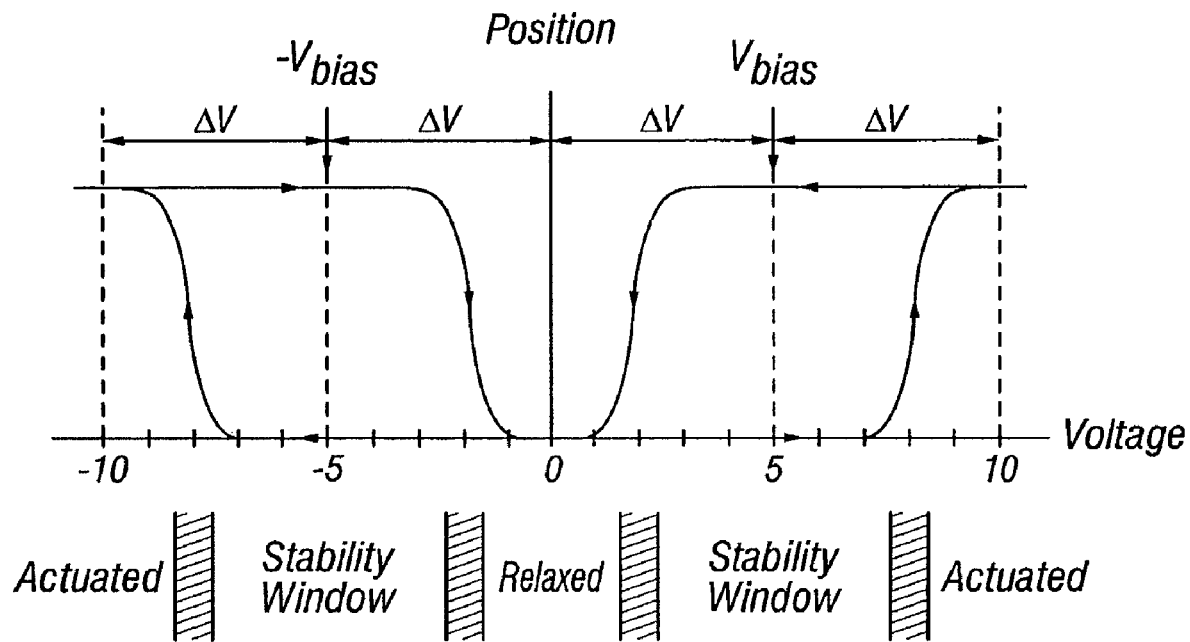
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
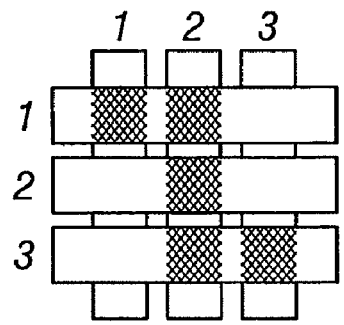
FIG. 5A illustrates one exemplary frame of display data in the 3×3 interferometric modulator display of FIG. 2.
Figure 5B:
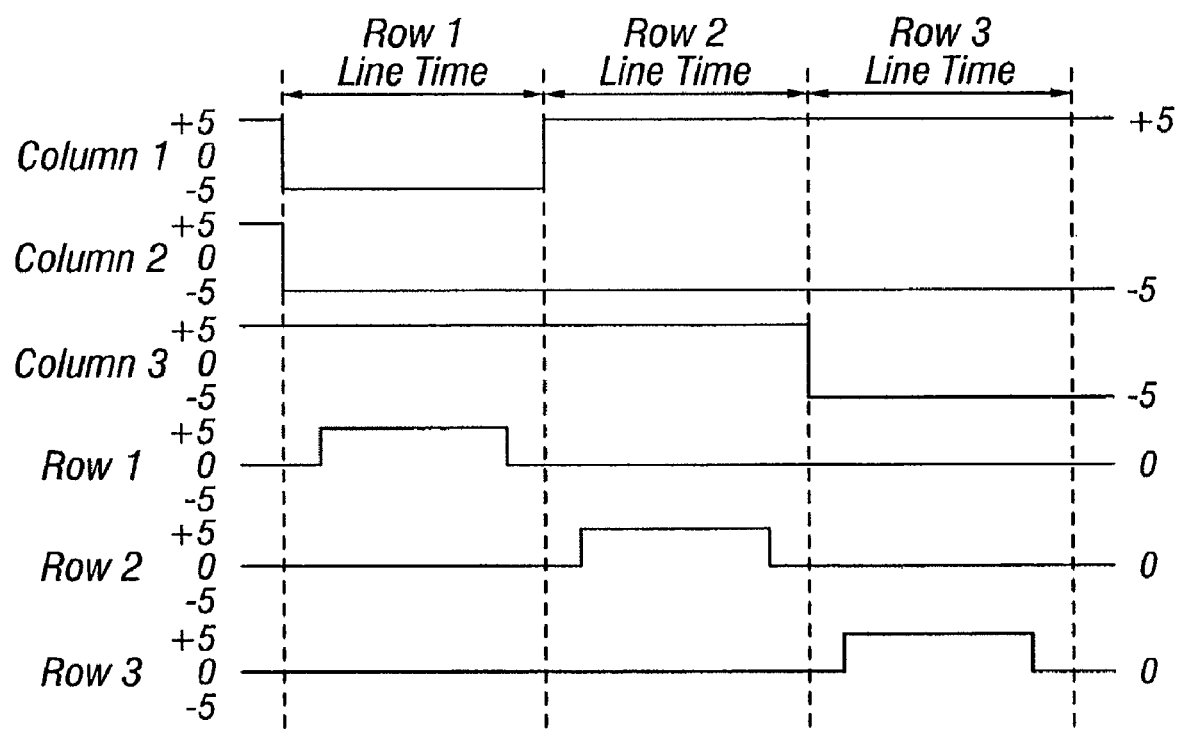
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volt, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volt, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
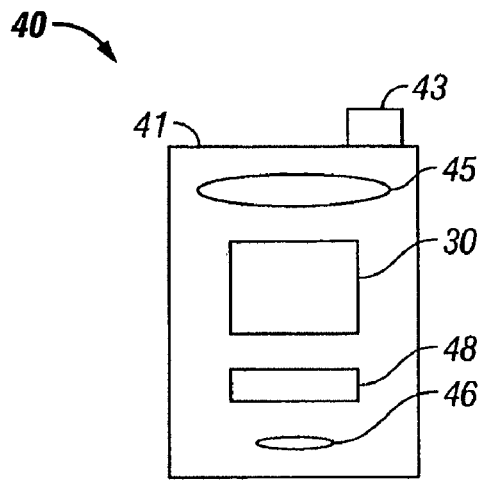
FIGS. 6A and 6B are system block diagrams illustrating an embodiment of a visual display device comprising a plurality of interferometric modulators.
Figure 6B:
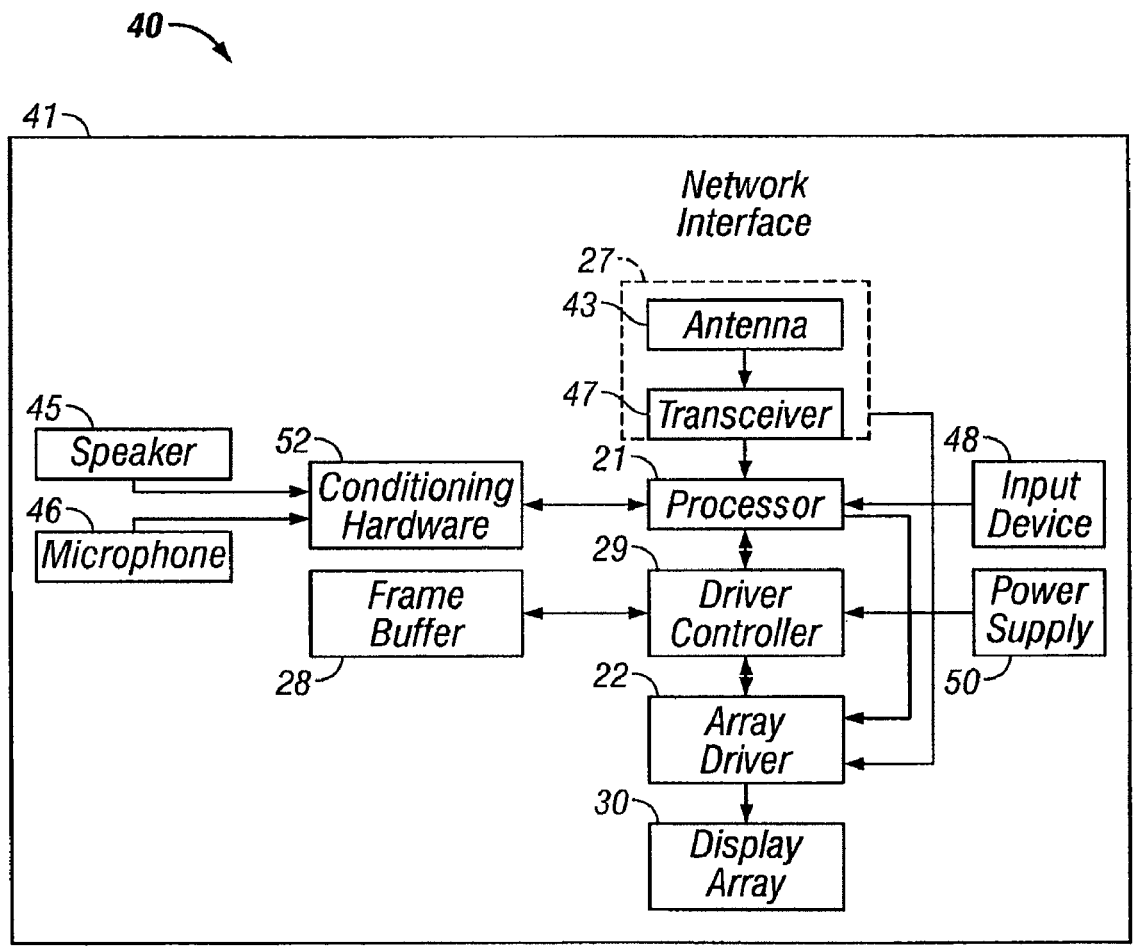

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

The processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. The conditioning hardware 52 generally includes amplifiers and filters for transmitting signals to the speaker 45, and for receiving signals from the microphone 46. The conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, the driver controller 29 is a conventional display controller or a bi-stable display controller (e.g., an interferometric modulator controller). In another embodiment, the array driver 22 is a conventional driver or a bi-stable display driver (e.g., an interferometric modulator display). In one embodiment, the driver controller 29 is integrated with the array driver 22. Such an embodiment is common in highly integrated systems such as cellular phones, watches, and other small area displays. In yet another embodiment, the display array 30 is a typical display array or a bi-stable display array (e.g., a display including an array of interferometric modulators).

The input device 48 allows a user to control the operation of the exemplary display device 40. In one embodiment, the input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

The power supply 50 can include a variety of energy storage devices as are well known in the art. For example, in one embodiment, the power supply 50 is a rechargeable battery, such as a nickel-cadmium battery or a lithium ion battery. In another embodiment, the power supply 50 is a renewable energy source, a capacitor, or a solar cell, including a plastic solar cell, and solar-cell paint. In another embodiment, the power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
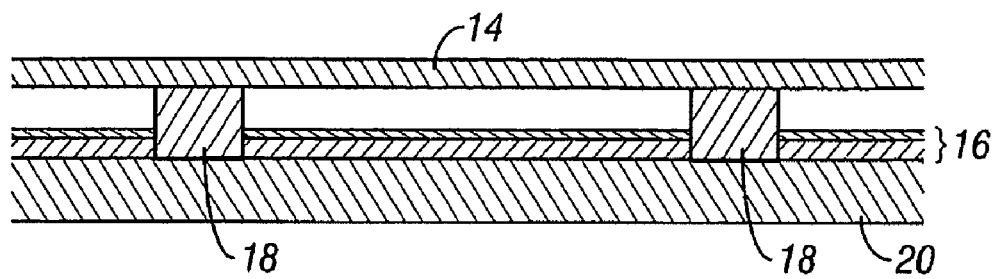
FIG. 7A is a cross section of the device of FIG. 1.
Figure 7B:
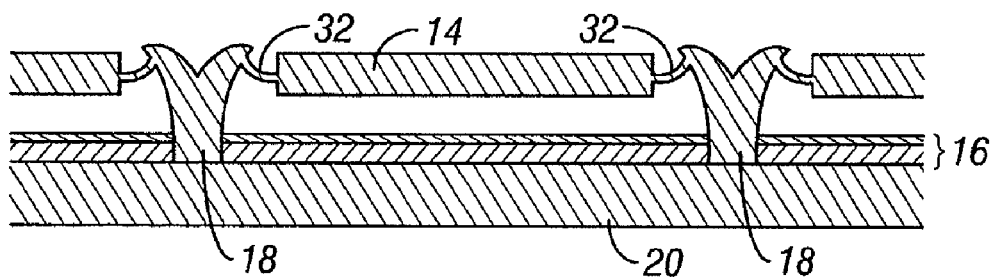
FIG. 7B is a cross section of an alternative embodiment of an interferometric Modulator.
Figure 7C:
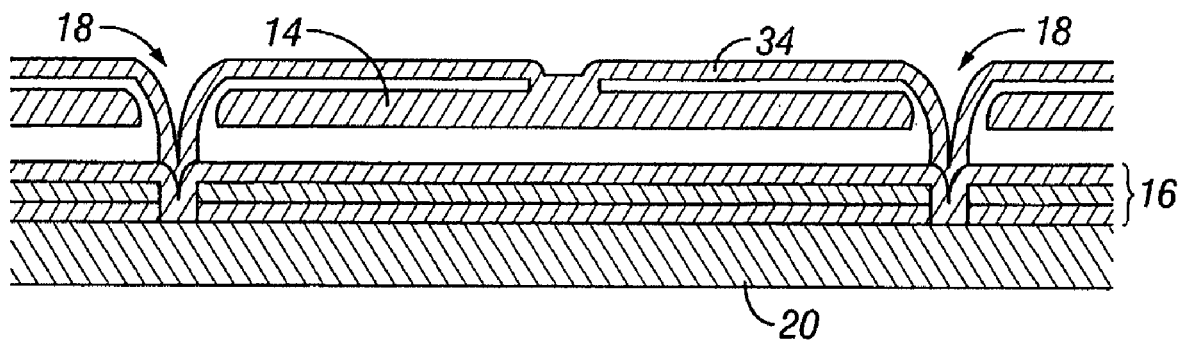
FIG. 7C is a cross section of another alternative embodiment of an interferometric modulator.
Figure 7D:
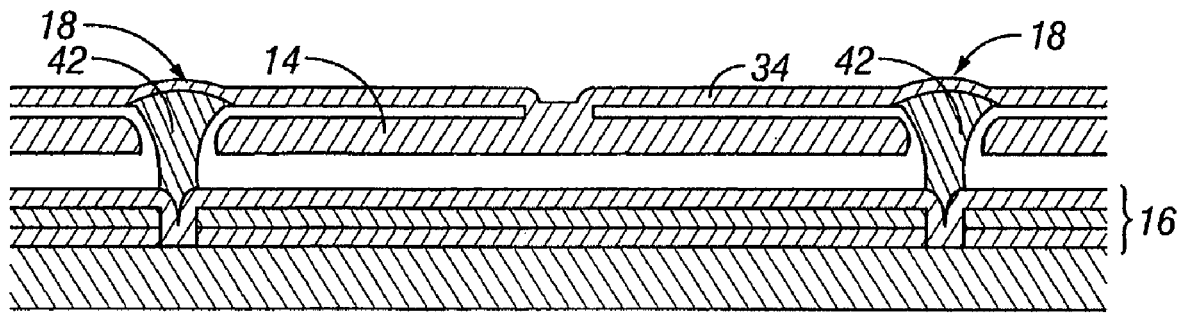
FIG. 7D is a cross section of yet another alternative embodiment of an interferometric modulator.
Figure 7E:
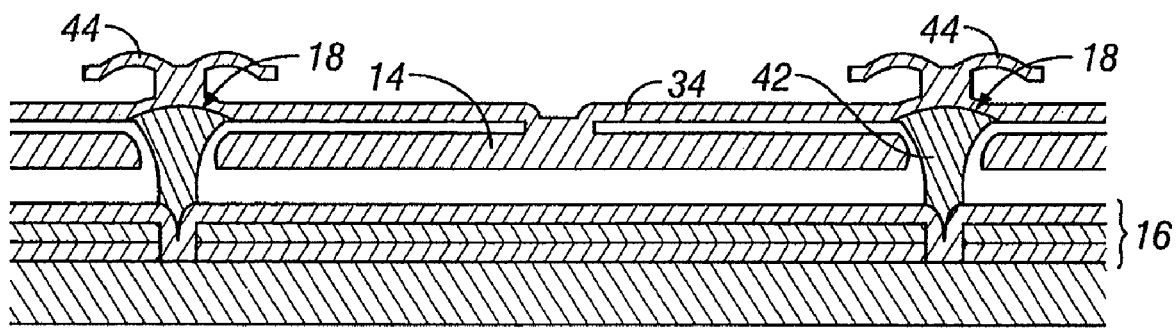
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending support structures or posts 18. In FIG. 7B, the moveable reflective layer 14 is attached to support structures 18 at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support structures or posts 18. The embodiment illustrated in FIG. 7D has support structures that include post plugs 42 upon which the deformable layer 34 rests. The movable reflective layer 14 remains suspended over the cavity, as in FIGS. 7A-7C, but the deformable layer 34 does not form the support posts 18 by filling holes between the deformable layer 34 and the optical stack 16. Rather, the support posts 18 are formed at least partially of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8:
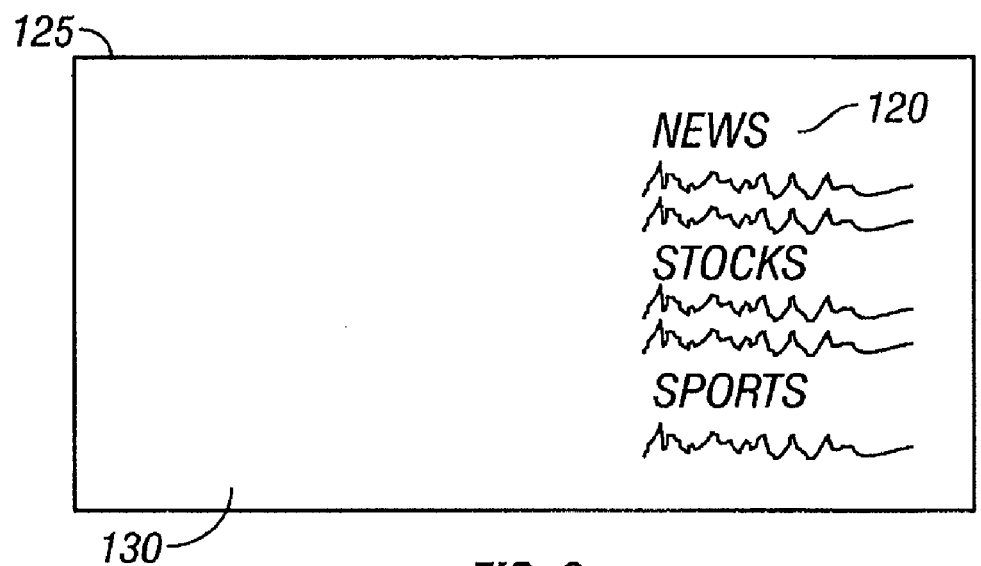
FIG. 8 shows an embodiment of an interferometric modulator that is used to provide an ornamental image on a specular surface.

FIG. 8 shows an embodiment of an interferometric modulator that is used to provide an ornamental image. In an embodiment, an interferometric modulator 125 is configured to be specular, e.g., mirror-like, instead of diffuse, as is typical for many embodiments of interferometric modulators. Generally, an interferometric modulator is specular and only appears diffuse if a diffusion material is used to change the characteristics of the reflected light. A portion 120 of the specular surface 130 of the interferometric modulator 125 is covered or patterned with diffuser material (as will be described in more detail below) to provide information or an ornamental image to a user while the user can use the specular surface for other uses, such as, for example, shaving or applying make-up. The image may include any type of information or image, including, but not limited to, news, stock quotations, logos, and ornamental images. In other embodiments, the interferometric modulator 125 is configured as a mirror on a vehicle, such as, for example, a rear-view mirror or a side mirror. Using interferometric modulator technology, the mirror can display useful information to the driver, such as the distance to obstructions behind the car when backing up (received from a sensor in the car) or an image of objects behind the car (received from a video camera in the car).

As noted above, the mirrors of an interferometric modulators are specular. Because the mirrors are specular, a diffuser, such as, for example, a diffuser film, is typically interposed between the display device and the viewer to provide a displayed image. The diffuser film is typically applied to the transparent substrate of the interferometric modulator after fabrication. The diffuser film is preferably formed of a polymer film, such as polyester or polycarbonate, and is preferably about 50-100 µm thick. The skilled artisan will appreciate that a thicker diffuser film increases the overall thickness of the display device. Diffusers of this type are known in the art and also used in, for example, LCD and OLED applications.

Figure 9:
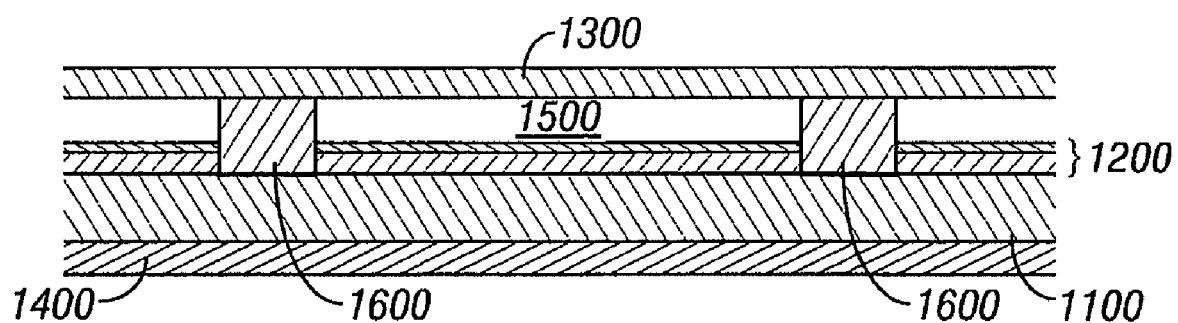
FIG. 9 is a cross section of an embodiment of an interferometric modulator having a diffuser.

FIG. 9 is a cross-sectional view of an interferometric modulator 1000 comprising a transparent substrate 1100, an optical stack 1200, a movable mirror/mechanical layer 1300, and a diffuser 1400. As shown in FIG. 9, the optical stack 1200 is formed over the transparent substrate 1100. A resonant optical cavity 1500 is between the optical stack 1200 and the movable mirror/mechanical layer 1300. The height of the optical cavity 1500 is selected for a particular choice of reflected color in the relaxed condition. In other arrangements, different cavities have different heights to produce multiple different colors, such as red, green, and glue for an RGB display system.

In the illustrated embodiment, the movable mirror/mechanical layer 1300 also functions as a movable reflective layer or second electrode, and thus may be referred to as a mechanical layer, a deformable layer, and/or electrode. The mirror/mechanical layer 1300 may comprise a fully reflective, flexible metal, as shown in FIGS. 7A and 7B, or it may support a separate mirror, as shown in FIGS. 7C-7E. Other suitable materials for the mirror/mechanical layer 1300 include, but are not limited to, aluminum, chromium, and other materials typically used for the electrode. The mirror/mechanical layer 1300 preferably connects, either directly or indirectly, to the transparent substrate 1100 around the perimeter of the mirror/mechanical layer 1300. As shown in FIG. 9, the mirror/mechanical layer 1300 is supported by support structures 1600.

The optical stack 1200 and mirror/mechanical layer 1300 may be of any type known in the art. For example, the optical stack 1200 may be similar to the optical stack 16 shown in FIGS. 7A-7E. The transparent substrate 1100 may be formed of material, such as, for example, glass, silica, alumina, etc. The transparent substrate 1100 is preferably formed to be about 0.5-1.1 mm thick. The skilled artisan will appreciate that, in some embodiments, the transparent substrate 1100 may be thinner. As discussed above, the optical stack 1200 typically comprises several integrated or fused layers, including a first electrode layer, such as ITO, a partially reflective layer, such as chromium, and a dielectric layer. The layers of the optical stack 1200 are preferably patterned into parallel strips to form row electrodes. Typically, the layers of the optical stack 1200 are deposited onto the transparent substrate 1100, preferably deposited by conventional deposition techniques, such as some form of sputtering, physical vapor deposition, and chemical vapor deposition (CVD). The dielectric layer of the optical stack 1200 is preferably formed of silicon dioxide ($SiO_2$). In other arrangements, the dielectric layer is formed of other insulating materials and can optionally include one or more etch stop layers to protect the optical stack 1200 from subsequent etch steps.

In some embodiments, the diffuser 1400 comprises a suitable transparent or translucent polymer resin, such as, for example, polyester, polycarbonate, polyvinyl chloride (PVC), polyvinylidene chloride, polystyrene, polyacrylates, polyethylene terephthalate, polyurethane, and copolymers or blends thereof. In some embodiments, the diffuser 1400 is a composite comprising a polymer resin, as described above, and one or more other components. In some embodiments, the other component is inorganic while in other embodiments, the other component is organic. In some embodiments, the other component provides diffusion to the diffuser 1400. For example, in some embodiments, the optical beads are dispersed within the diffuser. In other embodiments, the diffuser 1400 is monolithic. In some embodiments, the diffuser material is inherently diffusive. In some embodiments, a surface of the diffuser 1400 is patterned to provide diffusion. Either the surface of the diffuser 1400 proximal to the viewer, the surface distal to the viewer, or both are patterned. Some embodiments use a combination of these diffusion mechanisms, such as, for example, texturing a surface of an inherently diffusive material.

According to some embodiments, the diffuser 1400 is an inorganic material comprising an oxide and/or nitride, such as, for example, silica or alumina. In other embodiments, the inorganic material is crystalline. In still other embodiments, the inorganic material is amorphous.

According to some embodiments, the diffuser 1400 is applied to the transparent substrate 1100 after fabrication of the interferometric modulator 100. The diffuser 1400 is preferably applied using an adhesive. In some embodiments, the adhesive is pre-applied to the diffuser. In other embodiments, the adhesive is applied to the transparent substrate 1100 after fabrication of the interferometric modulator 1000. According to an embodiment, a two-part adhesive is used, in which a first component is applied to the diffuser 1400 and a second component is applied to the transparent substrate 1100. The skilled artisan will appreciate that other types of adhesives may be used, such as pressure sensitive and thermosetting adhesives. In some embodiments, the adhesive cures at about ambient temperature. In other embodiments, the adhesive is radiation-cured.

The skilled artisan will understand that the diffuser 1400 may also be fabricated on the transparent substrate 1100. For example, in some embodiments, an uncured polymer resin is applied to the transparent substrate 1100 by spin-coating or calendaring. The polymer resin is then cured to form the diffuser 1400.

Figure 10:
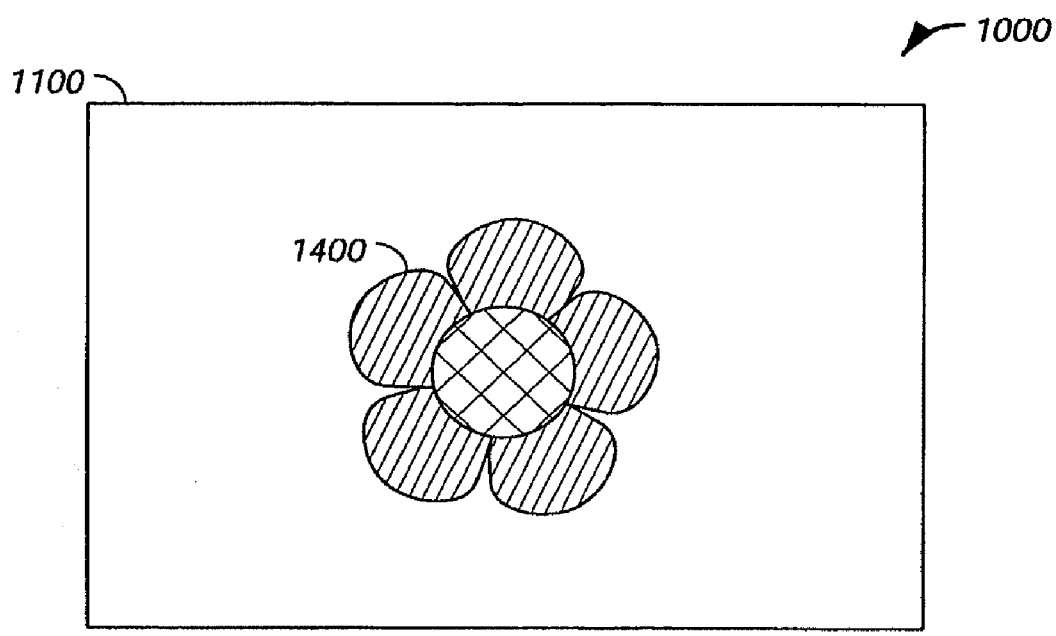
FIG. 10 is a top plan view of a patterned diffuser on a transparent substrate in an embodiment.

FIG. 10 is a top plan view of a patterned diffuser 1400 on a transparent substrate 1100 in accordance with an embodiment. As shown in FIG. 10, the diffuser 1400 is patterned to display a static ornamental image. The ornamental image is displayed in the areas in which the diffuser 1400 is present, as illustrated in FIG. 10. It will be understood that the thickness of the diffuser 1400 may be altered to create the ornamental image. The skilled artisan will understand that the diffuser 1400 may be patterned into any desired image or logo.

Figure 11:
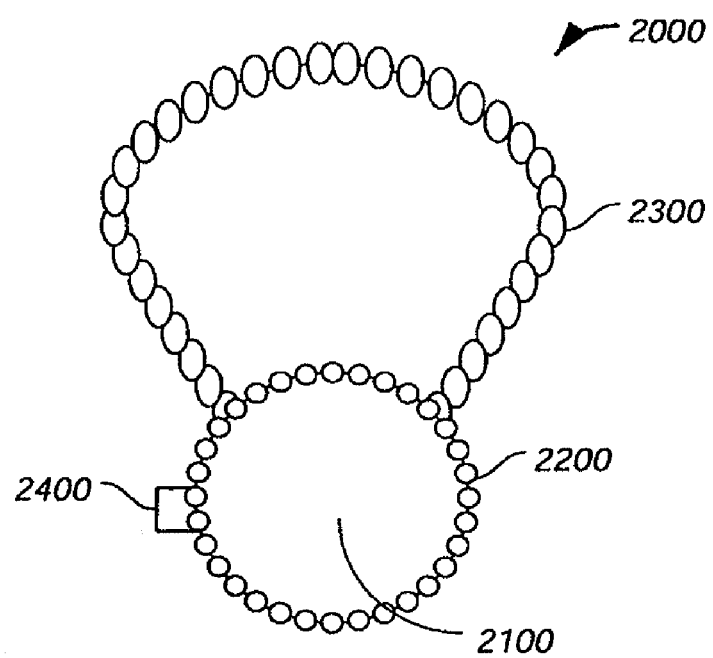
FIG. 11 shows an embodiment of an ornamental device including an interferometric modulator for displaying an ornamental image.

According to another embodiment shown in FIG. 11, an ornamental device 2000, such as, for example, jewelry, may include an interferometric modulator 2100 for displaying an ornamental image. In the illustrated embodiment shown in FIG. 11, the interferometric modulator 2100 has a display and is on a pendant 2200 on a chain 2300. The interferometric modulator 2100 preferably has one or more reflectance modes, wherein a different mode may be activated through a switch 2400. For example, in one mode, the display on the pendant 2200 can reflect a first set of selected colors, and when the switch 2400 is actuated for a second mode, the display on the pendant 2200 can reflect a second set of colors. In other embodiments, the display on the pendant 2200 may have more than two modes. According to an embodiment, the ornamental device 2000 has an automatic switching mechanism to cycle through two or more modes where the interferometric modulator 2100 reflects a different set of colors for each mode.

Figure 12A:
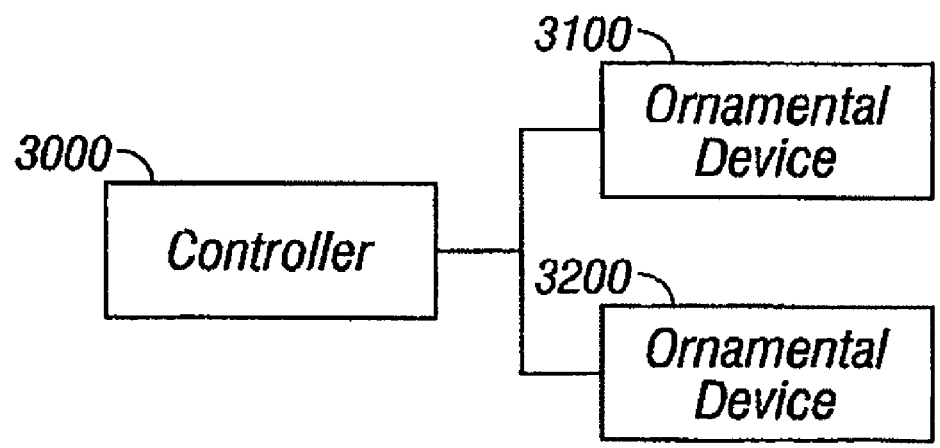
FIG. 12A is a system block diagram illustrating an embodiment in which a controller is used to coordinate displays on multiple interferometric modulator displays.
Figure 12B:
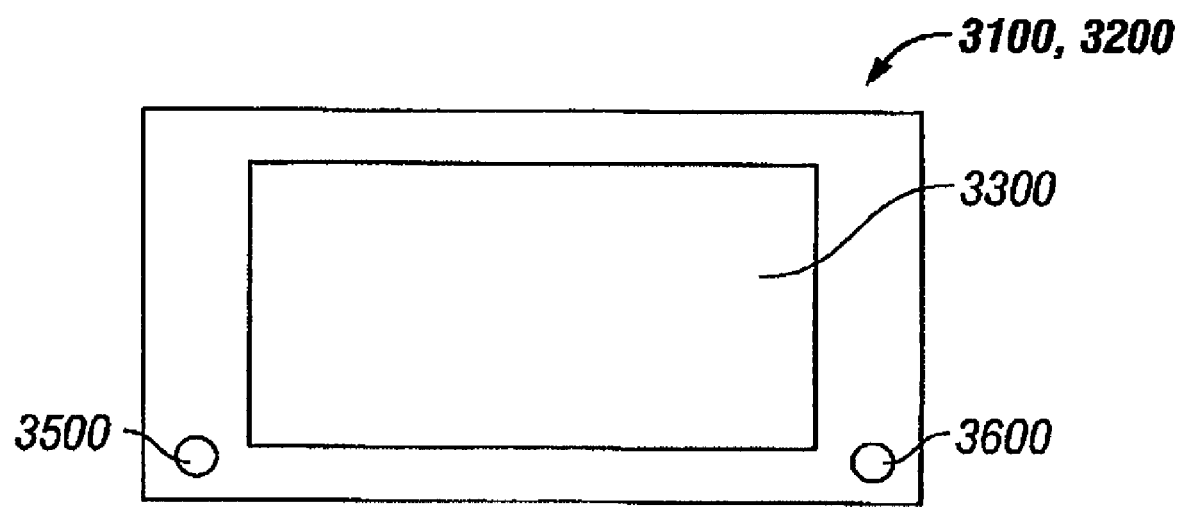
FIG. 12B is a top plan view of an embodiment of an ornamental device.
Figure 12C:
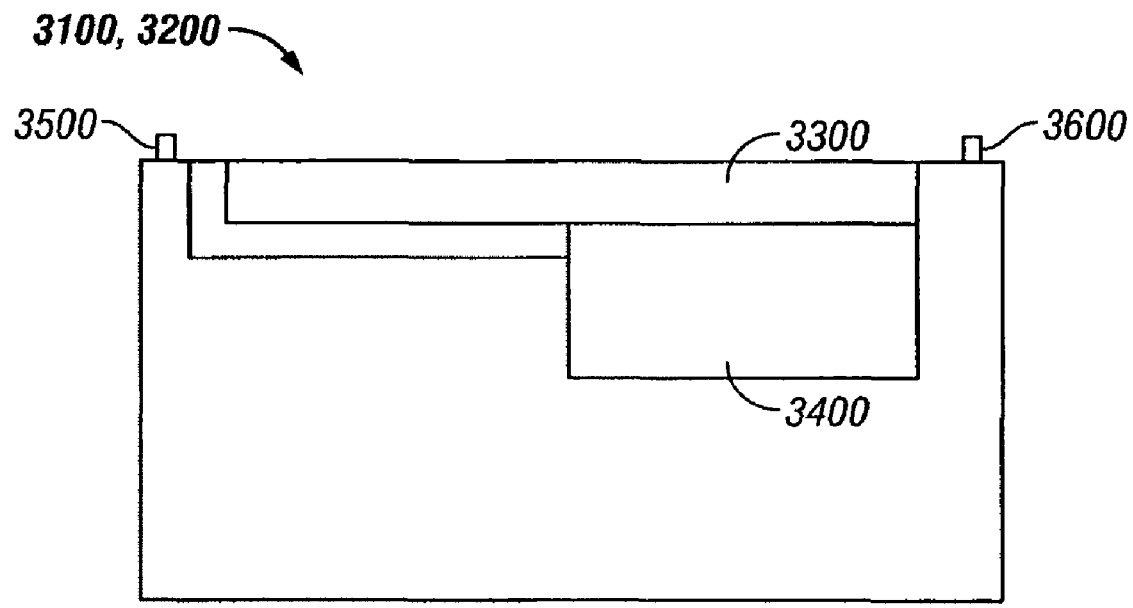
FIG. 12C is a side view of an embodiment of an ornamental device.

According to another embodiment illustrated in FIG. 12A, a controller 3000 may be used to control the displays of two or more ornamental devices (e.g., jewelry, belt buckle, watch, or other type of ornamental display) 3100, 3200 to display coordinated images. As shown in FIG. 12B, each of the ornamental devices 3100, 3200 preferably comprises an interferometric modulator 3300 having a display. Each of the ornamental devices 3100, 3200 preferably also comprise a processor 3400 for controlling an image on the display, and a signal receiver 3500 (e.g., an antenna) for receiving external signals, as shown in the illustrated embodiment in FIG. 12C. The processor 3400 preferably is configured to control the image on the display based on a signal received by the signal receiver 3500. In a preferred embodiment, the controller 3000 is configured to emit a signal, which can be received by a signal receiver 3500 on the ornamental device(s) 3100, 3200.

In an embodiment, the ornamental device 3100, 3200 may also include a switch 3600 for activating the display. In some embodiments, the switch 3600 is also connected to the processor 3400 and can activate more than one mode of the display such that the display reflects a first set of colors when a first mode is activated and reflects a second set of colors when a second mode is activated. In an embodiment, the switch 3600 can also rotate the display through multiple images.

According to another embodiment, the ornamental device 3100, 3200 comprises an array of interferometric modulators 3300 to form a programmable display. Preferably, each of the interferometric modulators 3300 comprises a signal receiver 3500 for receiving an external signal as well as a processor 3400 for maintaining a video sequence for an indefinite period of time on the display based on image data received from an external source, such as an external signal received from a controller 3000 by the signal receiver 3500. In some embodiments, the displayed image may be based on user input or is pre-programmed without receiving an external signal. For example, a user may be able to design an image to be displayed by the ornamental device. The skilled artisan will understand that the image(s) displayed may be either static or dynamic. In an alternative embodiment, the displayed image is based on the detected temperature of the environment surrounding the ornamental device. For example, if the environment is very warm, the displayed image may be shades of colors, such as red and orange. Alternatively, if the environment is very cool, the displayed image may be shades of the color blue.

In other embodiments, the displayed image may be pre-programmed. The ornamental device 3100, 3200 may be connected to an external source, such as a computer, for programming. A user may download from the computer certain images for display on the ornamental device 3100, 3200. The skilled artisan will understand that the user may use software to design the images on the computer prior to downloading the images to the ornamental device 3100, 3200. Alternatively, the user may download existing images from the computer to the ornamental device 3100, 3200.

Figure 13:
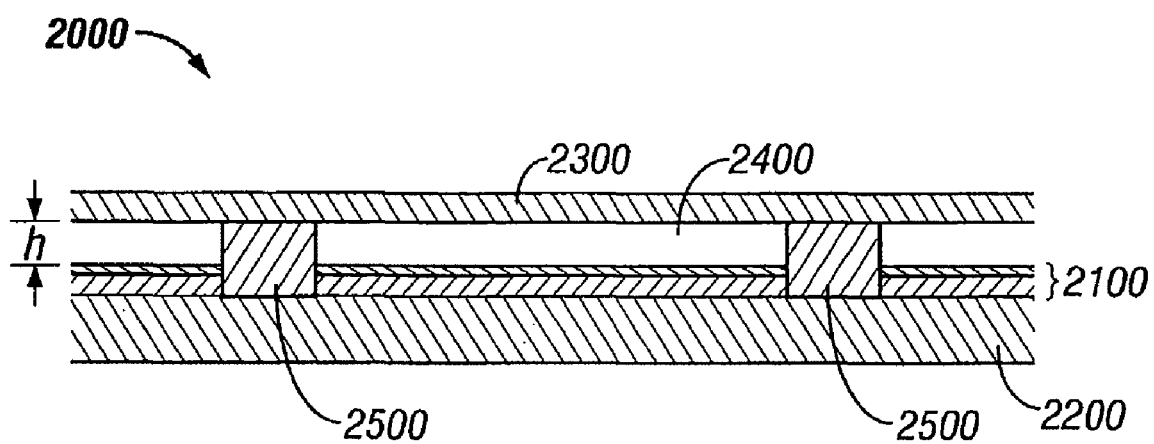

According to another embodiment, as shown in FIG. 13, an interferometric modulator 2000 is configured to display an image that appears iridescent. As shown in FIG. 13, a first electrode (in an optical stack) 2100 is formed over a transparent substrate 2200 and is separated from a second electrode 2300 by a resonant optical cavity 2400. As shown in FIG. 13, the second electrode 2300 is supported by support structures 2500.

In this embodiment, the first and second electrodes 2100, 2200 interferometrically modulate light such that more than one distinct color is reflected by the interferometric modulator 2000, thereby providing an iridescent (i.e., varying in color when seen from different angles) image. According to this embodiment, the image displayed depends on the angle from which it is viewed. Therefore, when viewed from one angle, the image will display a first color and when viewed from a different angle, the image will display a second color.

In a typical interferometric modulator, the specific color displayed by the interferometric modulator depends on the height of the cavity (i.e., the distance between the optical stack (first electrode and insulating dielectric formed over the first electrode) and the mirror layer (second electrode)). It will be understood that a typical interferometric modulator produces a slightly iridescent image and a diffuser, especially a thicker one, will mitigate the iridescent effect. In this embodiment, the iridescence of the image is "increased." According to an embodiment, the "increased" iridescent appearance of the display is achieved by altering the height h of the optical cavity 2400 to be greater than the height for producing one color. The skilled artisan will understand that if the height h of the cavity 2400 is larger, the interferometric modulator 2000 will reflect more than one distinct color, thereby providing an image having an iridescent appearance. Preferably, the height h of the cavity 2400 is greater than about 0.5 µm. In a preferred embodiment, the height h of the cavity 2400 is about 1 µm. In a preferred embodiment, the interferometric modulator 2000 is formed without a diffuser on the transparent substrate. In an alternative embodiment, the interferometric modulator 2000 is formed with a relatively thin layer of diffuser.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. An ornamental device, comprising:
a display having at least one interferometric modulator;
a signal receiver configured to receive an external signal; and
a processor configured to control an image on the display based on the external signal, wherein the external signal is emitted from a controller configured to control a plurality of ornamental devices to display coordinated images.

2. The ornamental device of claim 1, wherein the ornamental device is jewelry.

3. The ornamental device of claim 1, further comprising a switch configured to activate the display.

4. The ornamental device of claim 3, wherein the switch is configured to activate at least a first mode and a second mode of the display, wherein the display reflects a first set of colors when the first mode is activated and the display reflects a second set of colors when the second mode is activated.

5. The ornamental device of claim 3, wherein the switch is configured to activate at least a first mode and a second mode of the display, wherein the display reflects a first image when the first mode is activated and the display reflects a second image when the second mode is activated, wherein the first and second images are different.

6. The ornamental device of claim 1, further comprising a memory device in electrical communication with said processor, wherein the processor is in electrical communication with said display, said processor being configured to process image data.

7. The ornamental device of claim 6, further comprising a driver circuit configured to send a second signal to said display.

8. The ornamental device of claim 7, wherein the controller is configured to send at least a portion of said image data to said driver circuit.

9. The ornamental device of claim 6, further comprising an image source module configured to send said image data to said processor.

10. The ornamental device of claim 9, wherein said image source module comprises at least one of a receiver, transceiver, and transmitter.

11. The ornamental device of claim 6, further comprising an input device configured to receive input data and to communicate said input data to said processor.

12. A method of making an ornamental device, comprising:
providing a display having an interferometric modulator;
providing a signal receiver configured to receive an external signal; and
coupling a processor with the display and the signal receiver, wherein the processor is configured to control an image on the display based on the external signal, wherein the external signal is emitted from a controller configured to control a plurality of ornamental devices to display coordinated images.

13. The method of claim 12, wherein the ornamental device is jewelry.

14. The method of claim 12, further comprising coupling a switch to the display, wherein the switch is configured to activate the display.

15. The method of claim 14, wherein the switch is configured to activate at least a first mode and a second mode of the display, wherein the display reflects a first set of colors when the first mode is activated and the display reflects a second set of colors when the second mode is activated.

16. An ornamental device formed by the method of claim 12.

17. An ornamental device, comprising:
means for interferometrically modulating light;
receiving means for receiving an external signal; and
processing means for controlling an image on the modulating means based on the external signal, wherein the external signal is emitted from a controller configured to control a plurality of ornamental devices to display coordinated images.

18. The ornamental device of claim 17, wherein the receiving means comprises an antenna.

19. The ornamental device of claim 17, wherein the processing means comprises a processor.

20. The ornamental device of claim 17, wherein the ornamental device is jewelry.

21. The ornamental device of claim 17, further comprising a switching means for activating the modulating means.

22. The ornamental device of claim 21, wherein the switching means is configured to activate at least a first mode and a second mode of the modulating means, wherein the modulating means reflects a first set of colors when the first mode is activated and the modulating means reflects a second set of colors when the second mode is activated.

23. The ornamental device of claim 21, wherein the switching means is configured to activate at least a first mode and a second mode of the modulating means, wherein the modulating means reflects a first image when the first mode is activated and the modulating means reflects a second image when the second mode is activated, wherein the first and second images are different.

24. An ornamental article, comprising:
an array of interferometric modulators configured to form a programmable display; and
a processor configured to maintain a video sequence on the display, wherein the video sequence is pre-programmed or based on an external signal.

25. The article of claim 24, further comprising a signal receiver configured to receive an external signal.

26. The article of claim 24, wherein the article further comprises a switch configured to rotate the display through the video sequence.

27. The article of claim 24, wherein the display is configured to display an image based on user input.

28. The article of claim 27, wherein the article may be connected to an external source for programming.

29. The article of claim 28, wherein the external source is a computer.

30. The article of claim 24, further comprising an attachment element whereby the article may be worn.

31. The article of claim 24, wherein an image presented by the video sequence is static.

32. The article of claim 24, wherein the video sequence is dynamic.

33. The article of claim 24, wherein the video sequence displayed is based on a detected temperature of an environment surrounding the article.

34. The article of claim 24, wherein the video sequence displayed is based on image data received from an external source.

35. The article of claim 24, wherein the article is a watch.

36. An ornamental article, comprising:
means for interferometrically modulating light for forming a programmable display; and
processing means for maintaining a video sequence on the display, wherein the video sequence is based on either a pre-programmed image or an external signal.

37. The article of claim 36, further comprising a receiving means for receiving an external signal.

38. The article of claim 37, wherein the receiving means comprises an antenna.

39. The article of claim 36, wherein the article further comprises a switching means for rotating the display through a plurality of images.

40. The article of claim 36, wherein the display is configured to display an image based on user input.

41. The article of claim 40, wherein the article may be connected to an external source for programming.

42. A method of making an ornamental article, comprising:
providing a plurality of interferometric modulators;
configuring the interferometric modulators into an array to form a programmable display; and
electrically connecting a processor to the display for maintaining a video sequence on the display based on either a pre-programmed image or an external signal.

43. The method of claim 42, further comprising electrically connecting a signal receiver to the processor, wherein the signal receiver is configured to receive an external signal.

44. The method of claim 42, further comprising providing a switching means for rotating the display through a plurality of images.

45. The method of claim 42, wherein the display is configured to display an image based on user input.

46. The method of claim 45, further comprising connecting the article to an external source for programming.

47. The method of claim 42, wherein an image displayed is based on a detected temperature of an environment surrounding the article.

48. The method of claim 42, further comprising providing an attaching means for attaching the article, whereby the article may be worn.

49. The method of claim 48, wherein the attaching means comprises a chain.

50. An ornamental article formed by the method of claim 42.

* * * * *

UNITED STATES PATENT AND TRADEMARK OFFICE
CERTIFICATE OF CORRECTION

PATENT NO. : 7,944,601 B2  
APPLICATION NO. : 12/498281  
DATED : May 17, 2011  
INVENTOR(S) : Brian J. Gally et al.

Page 1 of 1

It is certified that error appears in the above-identified patent and that said Letters Patent is hereby corrected as shown below:

At Page 1, Item 54, Title, Line 1, before "DISPLAY" insert --ORNAMENTAL--.

At Column 1, Title, Line 1, before "DISPLAY" insert --ORNAMENTAL--.

At Column 1, Line 33, change "and or" to --and/or--.

At Column 1, Line 58, change "EMBODIMENT" to --EMBODIMENTS--.

At Column 3, Line 65, change "Modulator;" to --modulator;--.

At Column 4, Line 22, below "device; and" insert --FIG. 13 is a cross section of an embodiment of an interferometric modulator configured to display an image that appears iridescent.--.

At Column 6, Line 58, change "state.Since" to --state. Since--.

At Column 8, Line 52, change "one ore more" to --one or more--.

Signed and Sealed this  
Twenty-fourth Day of April, 2012

David J. Kappos  
*Director of the United States Patent and Trademark Office*